United States Patent
Abplanalp

(10) Patent No.: US 6,419,129 B1
(45) Date of Patent: *Jul. 16, 2002

(54) FLEXIBLE BARRIER MEMBER USEFUL IN AEROSOL DISPENSERS

(76) Inventor: Robert Henry Abplanalp, Ten Hewitt Ave., Bronxville, NY (US) 10708

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,460

(22) Filed: Jul. 7, 1997

Related U.S. Application Data

(63) Continuation of application No. 08/723,282, filed on Sep. 30, 1996, now abandoned, which is a continuation of application No. 08/572,116, filed on Dec. 14, 1995, now abandoned, which is a continuation of application No. 08/277,258, filed on Jul. 19, 1994, now abandoned, which is a continuation-in-part of application No. 08/253,143, filed on Jun. 2, 1994, now abandoned, which is a continuation-in-part of application No. 08/084,638, filed as application No. PCT/US94/07514 on Jun. 29, 1914, now abandoned.

(51) Int. Cl.⁷ .............................................. B65D 83/14
(52) U.S. Cl. ................................................. 222/386.5
(58) Field of Search ...................... 222/95, 105, 386.5, 222/387, 389

(56) References Cited

U.S. PATENT DOCUMENTS

| | | | |
|---|---|---|---|
| 1,471,091 A | 10/1923 | Bessesen | |
| 2,208,744 A | * 7/1940 | Bergerioux | 222/386.5 X |
| 2,533,428 A | 12/1950 | Carpenter | |
| RE23,343 E | 2/1951 | Mercier et al. | |
| 2,608,320 A | 8/1952 | Harrison, Jr. | |
| 2,649,995 A | 8/1953 | Muskin | |
| 2,671,579 A | 3/1954 | Knoblock | |
| 2,815,152 A | 12/1957 | Mills | |
| 2,889,078 A | 6/1959 | Thomas | |

(List continued on next page.)

FOREIGN PATENT DOCUMENTS

| | | |
|---|---|---|
| CA | 695371 | 10/1964 |
| CA | 813196 | 5/1969 |
| EP | 0 309 499 B1 | 6/1993 |

OTHER PUBLICATIONS

Johnson, Montfort A., "The Technology of Metal Aerosol Containers," *The Aerosol Handbook*, 2d. Ed. 1982, pp. 101–110, Illinois, U.S.A.

"Baumer Pressure Packs With Aluminum Pouch," Lechner Brochure, p. 3.

REM, Joseph P., "American is Left Holding the Bag –A Review of the Sterigard System," *Aerosol Age*, May 1971, p. 36, U.S.A.

"Introducing The Preval," *Aerosol Age*, Jan. 1966, p. 29 U.S.A.

Clark, Tom C., "A European Contribution to the Piston Can," *Aerosol Age*, Feb. 1966, p. 28, U.S.A.

"Second Generation Geigy Innovair$^R$ System," *Aerosol Age*, Jan. 1970, p. 82, U.S.A.

Boden, Herbert, "Hot Shave Technology," *Aerosol Age*, Mar. 1968, p. 19, U.S.A.

(List continued on next page.)

*Primary Examiner*—Joseph A. Kaufman
(74) *Attorney, Agent, or Firm*—Kilgannon & Steidl

(57) ABSTRACT

A dispenser comprising a valved aerosol container and a unitary flexible barrier member having an outer wall segment terminating at a sealing edge, which sealing edge is joined to the container between top and sidewall portions, and an inner wall segment joined to the outer wall segment through a fold and a central piston region emerging from the terminus of the inner wall segment distal to the old. The barrier being sufficiently thick and rigid to be free-standing before incorporation into a pressurized container. The outer and inner wall segments are oppositely-directed frustoconical shapes forming a small acute angle with each other when the barrier is initially inserted into the container. The outer wall segment may be thicker and more rigid than the inner wall segment. The barrier is nestable with like barriers.

12 Claims, 6 Drawing Sheets

U.S. PATENT DOCUMENTS

| | | | |
|---|---|---|---|
| 2,953,304 A | * 9/1960 | Sellinger | 222/386.5 X |
| 2,979,897 A | 4/1961 | Studhalter et al. | |
| 3,005,570 A | 10/1961 | Maulaz | |
| 3,018,970 A | 1/1962 | Wittenberg et al. | |
| 3,022,923 A | 2/1962 | Hoffman, Jr. | |
| 3,070,265 A | * 12/1962 | Everett | 222/386.5 |
| 3,109,463 A | * 11/1963 | Clemens | 222/386.5 X |
| 3,115,280 A | 12/1963 | Battista | |
| 3,145,884 A | * 8/1964 | Everett | 222/386.5 |
| 3,174,658 A | 3/1965 | Wittenberg et al. | |
| 3,189,231 A | 6/1965 | Kibbel, Jr. et al. | |
| 3,190,562 A | 6/1965 | Atwood et al. | |
| 3,235,137 A | 2/1966 | Bonduris | |
| 3,275,193 A | 9/1966 | Barr | |
| 3,289,891 A | 12/1966 | Frankenberg | |
| 3,319,420 A | 5/1967 | Mercier | |
| 3,319,837 A | 5/1967 | Mueller | |
| 3,321,112 A | 5/1967 | Cunningham et al. | |
| 3,342,377 A | 9/1967 | Peredy | |
| 3,343,422 A | 9/1967 | McSmith | |
| 3,378,169 A | 4/1968 | Clark et al. | |
| 3,393,842 A | 7/1968 | Bruce et al. | |
| 3,407,974 A | 10/1968 | Chmielowiec | |
| 3,408,731 A | 11/1968 | Mercier | |
| 3,415,425 A | * 12/1968 | Knight et al. | 222/386.5 |
| 3,430,731 A | 3/1969 | Satzinger | |
| 3,464,593 A | 9/1969 | Abplanalp | |
| 3,494,513 A | 2/1970 | Bauer | |
| 3,516,578 A | 6/1970 | Grossman et al. | |
| 3,548,564 A | 12/1970 | Bruce et al. | |
| 3,570,544 A | 3/1971 | Ortheil | |
| 3,589,862 A | 6/1971 | Veloz | |
| 3,620,420 A | * 11/1971 | Normos | 222/386.5 |
| 3,625,256 A | 12/1971 | Smith | |
| 3,659,675 A | 5/1972 | Edelstein et al. | |
| 3,721,371 A | 3/1973 | Dolveck | |
| 3,756,476 A | 9/1973 | Bonduris | |
| 3,788,521 A | 1/1974 | Laauwe | |
| 3,813,011 A | 5/1974 | Harrison et al. | |
| 3,819,092 A | 6/1974 | Bonduris | |
| 3,847,307 A | 11/1974 | Hosek | |
| 3,847,309 A | 11/1974 | Grossman | |
| 3,874,052 A | 4/1975 | Schantz | |
| 3,876,119 A | 4/1975 | Lamkin | |
| 3,895,746 A | 7/1975 | Bauer | |
| 3,896,970 A | 7/1975 | Laauwe | |
| 3,905,517 A | * 9/1975 | Friedrich et al. | 222/386.5 X |
| 3,929,132 A | 12/1975 | Higuchi | |
| 3,940,031 A | 2/1976 | Fishman | |
| 3,976,223 A | 8/1976 | Jass et al. | |
| 3,981,418 A | 9/1976 | Williamson et al. | |
| 3,986,641 A | 10/1976 | Casey | |
| 3,989,165 A | 11/1976 | Shaw et al. | |
| 3,992,003 A | 11/1976 | Visceglia et al. | |
| 3,995,632 A | 12/1976 | Nakano et al. | |
| 3,995,723 A | 12/1976 | Holcomb, Jr. | |
| 3,998,359 A | 12/1976 | Pettit | |
| 4,034,896 A | 7/1977 | Wilson | |
| 4,045,860 A | 9/1977 | Winckler | |
| 4,067,499 A | 1/1978 | Cohen | |
| 4,087,026 A | 5/1978 | Petterson | |
| 4,089,443 A | * 5/1978 | Zrinyl | 222/386.5 |
| 4,113,151 A | 9/1978 | Brown et al. | |
| 4,129,025 A | 12/1978 | Carey et al. | |
| 4,148,416 A | 4/1979 | Gunn-Smith | |
| 4,162,030 A | 7/1979 | Capra et al. | |
| 4,174,767 A | 11/1979 | Kramer | |
| 4,185,758 A | 1/1980 | Giggard | |
| 4,189,069 A | 2/1980 | Stoody | |
| 4,191,305 A | 3/1980 | Davis | |
| 4,199,082 A | 4/1980 | Ornsteen | |
| 4,202,470 A | 5/1980 | Fujii | |
| 4,213,545 A | 7/1980 | Thompson et al. | |
| 4,265,373 A | 5/1981 | Stoody | |
| 4,280,637 A | 7/1981 | Runciman | |
| 4,295,582 A | 10/1981 | Acres | |
| 4,305,428 A | 12/1981 | Burton | |
| 4,322,020 A | 3/1982 | Stone | |
| 4,355,736 A | 10/1982 | Schumacker et al. | |
| 4,437,590 A | 3/1984 | LaBruna | |
| 4,491,250 A | 1/1985 | Liebermann | |
| 4,585,143 A | 4/1986 | Fremow et al. | |
| 4,679,706 A | 7/1987 | Magid et al. | |
| 4,823,577 A | 4/1989 | Wusterbarth | |
| 4,836,409 A | * 6/1989 | Lane | 222/386.5 X |
| 4,844,301 A | 7/1989 | Juillet | |
| 4,889,189 A | 12/1989 | Rozniecki | |
| 4,896,794 A | 1/1990 | Banks et al. | |
| 4,923,095 A | 5/1990 | Dorfman et al. | |
| 4,951,847 A | * 8/1990 | Hardt et al. | 222/386.5 |
| 4,969,577 A | 11/1990 | Werding | |
| 4,978,033 A | 12/1990 | Chou | |
| 5,007,556 A | 4/1991 | Lover | |
| 5,009,340 A | 4/1991 | Morane | |
| 5,037,367 A | 9/1991 | Boxal | |
| 5,060,826 A | 10/1991 | Coleman | |
| 5,102,311 A | 4/1992 | Lambeck | |
| 5,115,944 A | 5/1992 | Nikolich | |
| 5,135,137 A | 8/1992 | Rudick | |
| 5,143,390 A | 9/1992 | Goldsmith | |
| 5,301,838 A | 4/1994 | Schmidt et al. | |

OTHER PUBLICATIONS

"Key Piston –A New Aerosol Patent," *Aerosol Age*, Jul. 1968, p. 52, U.S.A.

Casey, Don. E., "Aeratron Barrier Pack System Now in Production," *Aerosol Age*, Apr. 1975, p. 30, U.S.A.

Irland, L. F. and Kinnavy, J. W., "The Sepro Can," *Drug & Cosmetic Industry*, vol. 101, No. 2, Aug. 1967, p. 42, U.S.A.

Thornton, Jr., M. L., "Geigy's Innovair Aerosol System," Detergent Age, Aerosol Packaging/Marketing Supplement, May 1968, p. 151, U.S.A.

"Selvac is Back," *Aerosol Age*, Jun. 1972, p. 27, U.S.A.

Hoffman, Jr., H. T., "The Free–Piston Aerosol," *Modern Packaging*, Aug. 1961, p. 1961, p. 129, U.S.A.

Boyne, Robert W., "The Aluminum–Plastic Piston Aerosol," *Detergent Age, Aerosol Packaging/Marketing Supplement*, May 1968, p. 147, U.S.A.

Schultz, R. S., "Free Piston Container," *Soap and Chemical Specialties*, Mar. 1962, p. 127, U.S.A.

"Sterigard Seeks Brader Applications for Bag–In–a–Can Aerosol," *Detergent Age, Aerosol Packaging/Marketing Supplement*, May 1968, p. 142, U.S.A.

"Cebal Unveils Presspacks System –A New Pressure Container," *Aerosol Age*, May 1973, p. 38, U.S.A.

Sciarra, John J. and Stoller, Leonard, "Types of Aerosol Systems," *The Science and Technology of Aerosol Packaging*, Publ. 1974 by John Wiley & Sons, Inc., U.S.A., p. 50.

Sanders, Paul A., "Miscellaneous Aerosol Systems," *Principles of Aerosol Technolgy*, Publ. 1970, Van Nostrand Reinhold Co., U.S.A., p. 350.

Sanders, Paul A., "Containers," *Handbook of Aerosol Technology*, Publ. 1979, Van Nostrand Reinhold Co., U.S.A. p. 73.

"Rollbag–When Your Product is Delicate," Boxal UK Brochure, 199_.

* cited by examiner

FLEXIBLE BARRIER MEMBER USEFUL IN AEROSOL DISPENSERS

This is a continuation of Ser. No. 723,282 filed Sep. 30, 1996, now abandoned, which is a continuation of Ser. No. 572,116 filed Dec. 14, 1995, now abandoned, which is a continuation of Ser. No. 277,258 filed Jul. 19, 1994, now abandoned, which is a continuation-in-part of Ser. No. 253,143 filed Jun. 2, 1994, now abandoned, and a continuation-in-part of Ser. No. 084,638 filed Jun. 29, 1993, now abandoned, and a 371 of PCT/US94/07514 filed Jun. 29, 1994.

BACKGROUND OF THE INVENTION

1. Field of the Invention

This invention relates to pressurized dispenser packages, such as aerosol packages, wherein the product to be dispensed and the pressure-generating media, i.e. the propellant, are maintained in isolation through separation on opposite sides of a barrier. An aerosol package of this type is generally referred to as a "barrier pack" aerosol package.

2. Description of the Prior Art

Aerosol barrier packs of the prior art have been of at least three general types. In the piston-type barrier pack the barrier is a piston-like component that is mounted in the container in sliding relation to the inside surface of the container. The product to be dispensed is disposed on the valved side of the piston and the propellant, which generates pressure within the container, is on the opposite side of the piston. In Aerosol Handbook, Second Edition, 1982, there is described a piston-type aerosol dispenser marketed by American Can Company under the tradename "Mira-Flo". In the Mira-Flo dispenser the piston skirt is designed to seal against the sides of the container to prevent the propellant gas from passing into the product chamber on the other side of the piston. Actuation of the aerosol discharge valve causes a reduction in pressure in the product chamber thereby resulting in the pressure in the propellant chamber urging the piston toward the discharge valve and causing the discharge of product through the discharge valve. Examples of a piston-type barrier pack are described in U.S. Pat. Nos. 3,022,923, 3,756,476 and 3,929,132.

In a second type of aerosol barrier pack, a flexible, collapsible bag is affixed within the container opening either to the aerosol discharge valve or to the bead of the container opening. The Continental Can Company in the late 1960's introduced an aerosol barrier dispenser known as the "Sepro-Can". The Sepro-Can includes an interior plastic product bag having an opening that is attached to the valve opening at the top of the container. The side walls of the bag extend along the side walls of the container and are pleated like an accordion so the bag can collapse inward and upward under the influence of pressure in the remainder of the container as the bag is emptied. Patents which illustrate a barrier pack of the second type are set forth in U.S. Pat. Nos. 3,788,521, 3,896,970 and 4,067,499. Modifications of barrier packs of the second type include attaching the bag to the side wall of the container or to the joint formed between the side wall of the container and the top of the container.

A third type of prior art barrier pack is an unfolding cup-shaped barrier wherein the barrier has an outer wall terminating in a sealing flange, said outer wall being disposed contiguous to the inner wall of the container. The inner wall of the barrier is initially folded within the outer wall, the inner wall terminating in an end closing portion. The barrier is contained in a valved aerosol container and sealed at the joint formed between the sidewall and the bottom end closure of the container. Product is admitted through the valved opening of the container and propellant through a port in the bottom end closure of the container. Actuation of the valve reduces the pressure in the product compartment and results in the inner wall of the barrier unfolding from within the outer wall of the barrier and causing the end-closing portion of the inner wall of the barrier to advance and thereby urge the product toward the discharge valve. A patent which illustrates the third type of prior art barrier pack is U.S. Pat. No. 3,109,463.

A problem with the piston-type barrier pack of the first type is the imperfect seal between the side skirt of the piston and the side wall of the container which allows propellant to seep into the product with consequent discharge of propellant during product discharge as well as contamination of the product with propellant. Also, it is not uncommon for aerosol containers to be dented and thus lose their true circumferential shape, with the consequence that the piston is incapable of axial movement within the container past the aberrant configuration.

A problem with barrier packs of the second type wherein the barrier is affixed to the valve or valve opening of the container is that the barrier collapses in a manner to cause pocketing of the product within the collapsible barrier with consequent undesirable diminution of the evacuation of the product from the container.

In the third type of prior art barrier pack described herein, the unfolding cup-shape barrier does not advance progressively and uniformly against the inner wall of the container but tends to pocket and entrap product against the wall or within pockets formed in the barrier itself as it unfolds. Attempts to solve these problems have included adding an additional rigid piston to the end-closing portion of the inner wall, or adhering the outer wall of the barrier in peelable fashion to the inner wall of the container. Generally, barriers of the third type can be difficult to form, as well as to insert into and seal with the container.

There is, therefore, a need for a flexible product/propellant barrier for an aerosol container that is easy to manufacture and ship, that is easy to insert into and seal to the container, that prevents leakage of the fluids from one compartment to the other compartment, and that does not pocket and therefore preclude evacuation of significant amounts of the product to be discharged.

SUMMARY OF THE INVENTION

The present invention relates to an improvement in the third type of barrier pack. In its broadest aspect, the present invention concerns a unitary flexible and expandable barrier for use in a plural-zoned, valved, pressure container wherein the barrier has a shaped spatial form having sufficient rigidity to maintain its shape prior to insertion into and use in a plural-zoned, valved pressure container. The barrier comprises a flexible and expandable wall portion having an outer wall segment and an inner wall segment connected by an angled fold, the free terminal end of the outer wall segment forming a sealing means and the terminus of the inner wall segment distal to the fold extending into a central piston region that closes the barrier. In a preferred form, the outer wall segment is steeply frustoconical in shape and terminates at its free end in a sealing means, and the inner wall segment is disposed in juxtaposed relation to the inner surface of the outer wall and in steeply frustoconical shape opposite to the frustoconical shape of the outer wall segment so as to form a small acute angle between the outer wall segment and the inner wall segment; the terminus of the inner wall segment distal to the fold being closed by a central piston region to thereby complete the unitary barrier member. Further, the inner wall segment is sufficiently flexible to permit the inner wall segment and said central piston region to move in an axially downward direction under the influence of product pressure when the barrier is top sealed within a container, to assume a more or less phallic configuration. Still further, the outer and inner wall segments have sufficient flexibility and expandability to extend outwardly under the influence of product pressure to substantially conform to the inner surface of the container. When the outer wall segment is sufficiently thicker and more rigid than the inner wall segment, the outer wall segment will tend to continue to substantially conform to the inner surface of the container, and the flexible inner wall segment will invert within the outer wall segment under the influence of propellant pressure to substantially return the barrier to approximately its shape as initially disposed in the container. Thereafter, the inner wall segment and central piston area will stretch radially outwardly and upwardly to substantially evacuate the product in the container. When the outer wall segment is less thick and less rigid, the inner wall segment and central piston will move axially upward under the influence of propellant pressure, followed by both the outer and inner wall segments crumpling tightly together and moving upward. In this latter instance, at least in the case of low viscosity products, product will be substantially evacuated from the container.

By virtue of having sufficient rigidity to maintain its shape prior to insertion into the container, as well as the presence of the tapered outer wall segment, the barrier of the present invention is very easily insertable into the top of the container. By virtue of the tapered outer and inner wall segments, the barrier is nestable with like barriers for convenience and cost savings in shipping. Further, the nesting facilitates fast and simple machine feeding of stacked barriers sequentially into the containers.

In a preferred form of the invention the outer wall segment is thicker and more rigid than the inner wall segment; the inner wall segment also is of slightly less length than the outer wall segment; and the sealing means is a radially extending flange which acts as a gasket between the top of the sidewall of the container and the top closure of the container. The central piston region also may be thicker than the inner wall segment.

A particularly advantageous material for barriers is polyethylene terephthalate (PET). Where permeation across the barrier is a concern, the barrier of the present invention may utilize a unitary multi-layer configuration. Such multi-layer configurations, their materials of construction and their manufacture, are well known to those skilled in the art. Generally, in a three-layer system, the inner layer is a material that prevents transport of propellant and product therethrough and the outer layers are inert to the propellant and product.

DETAILED DESCRIPTION OF THE INVENTION

Figure 1:
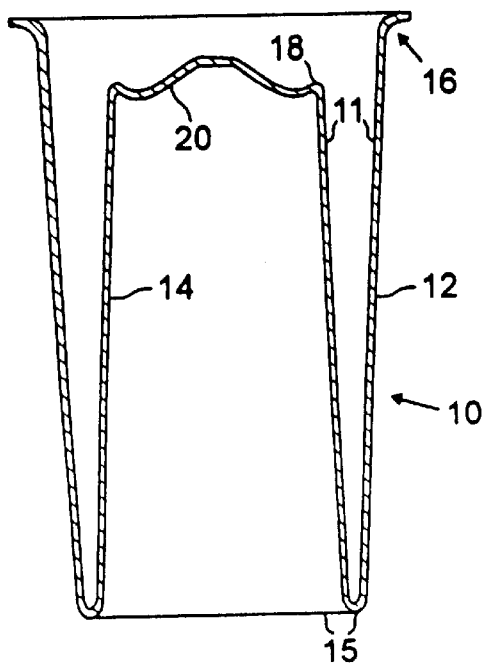
FIG. 1 is an elevational cross-sectional view of an embodiment of the barrier of this invention.

Referring now to the drawings, FIG. 1 shows a unitary barrier generally designated at 10, as it is initially formed, said barrier having a wall 11 comprising a flexible and expandable outer wall segment 12 and a flexible and expandable inner wall segment 14 connected by a fold 15, the outer wall segment 12 terminating in a sealing flange 16. At the terminus 18 of the inner wall segment 14, central piston region 20 extends inwardly to close the barrier. It should be noted that the outer wall segment 12 has a steeply frusto-conical shape extending from the sealing flange 16 to the fold 15, and that the inner wall segment 14 has a steeply frustoconical shape oppositely directed to the outer wall segment 12 extending from the fold 15 to the central piston region 20.

The outer wall segment 12, including the sealing flange 16, is sufficiently thick and rigid to impart a shaped spatial form to the barrier and causes the barrier to be free-standing and ready for insertion into the container.

It has been found that a barrier formed of PET with the following dimensions has performed satisfactorily as a barrier in a pressurized container:

Sealing Flange Thickness—0.007"

Outer Wall Segment Thickness—0.007" adjacent the flange narrowing to 0.004" at the fold Inner Wall Segment Thickness—0.004" adjacent the fold narrowing to 0.002" adjacent the central piston region Central Piston Region—0.002" at the joinder of the inner wall segment and the central piston region and increasing to 0.004" immediately within the aforesaid joinder and thickening to 0.007" at the center area of the piston Length of Outer Wall Segment—3⅛"

Length of Inner Wall Segment—2¹⁹⁄₃₂"

Container used with aforedescribed PET barrier was a 202×509 straight sided can which is 2⅛" in diameter and 5⁹⁄₁₆" in length.

The barrier had a 1° taper to each of the outer and inner wall segments, 12 and 14, respectively, to form a fold 15 providing an included angle of 2° between the outer and inner wall segments, 12 and 14. It is believed that a 3° taper to each of the inner and outer wall segments will also function satisfactorily. The central piston region for the above-described barrier had a configuration as shown in FIG. 1, wherein the terminus 18 at the perimeter of the piston had a depth of 0.188" and a radius of 0.063". The sealing flange 16 for the described barrier had a turning radius into outer wall segment 12 of 0.078".

Figure 2:
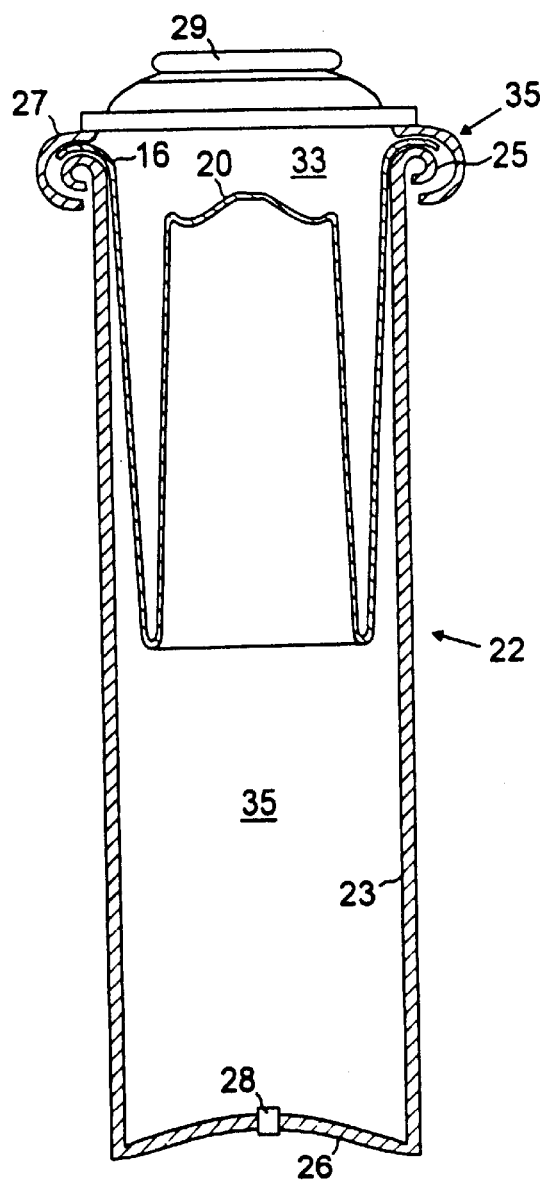
FIG. 2 is an elevational cross-sectional view of the barrier of FIG. 1 positioned within an empty aerosol container with the top opening of the container shown in schematic and the aerosol valve not shown.

FIG. 2 shows the barrier 10 inserted in a valved pressure container, generally designated as 22, having inner wall surface 23, and permanently joined to the container 22 through the sealing flange 16 by an appropriate crimping of the flange 16 between the joint formed by the upper end 25 of the sidewall of the container 22 and the perimeter of the upper closure 27 of the container 22. Without intention to limit the type of pressure container (aerosol) with which the barrier pack of this invention may be usefully employed, it has been found particularly useful when employed with an aerosol container commonly referred to as a "necked-in" container. A sealable port 28 is provided in the bottom closure 26 for introduction of propellant. A manually actuable valve (not shown) is positioned in a manner well-known to those skilled in the art in the opening 29 of the pressure container 22.

In FIG. 2, the barrier 10 divides the interior of the container 22 into a plural zoned pressure container; the upper zone 33 for receiving the product to be dispensed and the lower zone 35 for receiving the propellant. Generally, the container manufacturer will insert the barrier 10 into container 22, and seal the barrier to the container as described above. A product filler will thereafter fill the product and propellant into the respective chambers 33 and 35.

Figure 3:
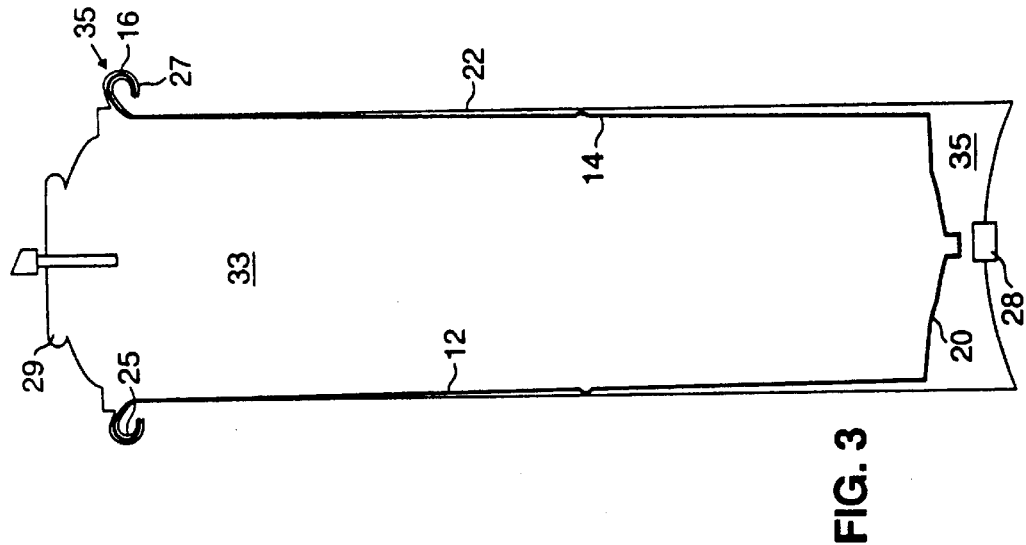
FIG. 3 is a schematic view of the barrier of this invention within an aerosol container showing the barrier in a position after loading of the product into the container but prior to introducing propellant to the container.

After sealing flange 16 between the top portion of the container 22 and the upper sidewall of the container 22, product is introduced into the product zone 33 to cause the barrier 10 to fully expand downwardly within the container 22 to substantially conform to the inner surface 23 of the container 22, such as is shown in FIG. 3. During the filling of the product into the container it may be necessary to provide a means for evacuating air in the propellant and/or product zone. After introducing propellant into the propellant zone 35, the container is ready to function to discharge product through actuation of the aerosol valve positioned in the container opening 29.

FIG. 2 shows a configuration for annexing the barrier 10 to the container 22. FIG. 2 shows the barrier pack 10 having a terminal flange 16 extending from the outer wall segment 12. The flange 16 fits tightly between the flanges 25 and 27. The seam is formed by rolling the flanges 25, 27 and 16 toward the side wall 12 to form a rolled seam by techniques known to those skilled in the art. The thickness and length of the sealing flange 16 is dictated by the requirements of rolled seams, which may vary by type of container and rolling equipment. The sealing flange 16 may be thicker than the contiguous outer wall segment 12. The sealing flange 16 may function as a gasket in sealing the barrier to the base of the container. If necessary, an adhesive may be provided to the components that are to be roll seamed.

FIG. 3 shows the barrier in an initial position a short period of time after loading the container with product. Upon continuous or intermittent actuation of the valve disposed in the top opening of the pressurized container, product will be evacuated from the container by lowering the pressure in the product zone 33 and causing the greater pressure in the propellant zone 35 to begin to invert the inner wall 14 of the barrier 10 within the outer wall 12 and thereby force the product through the discharge valve of the container. As product is evacuated from the container 22, the inner wall segment 14 and the central piston region 20 move axially toward the aerosol discharge valve as the barrier inverts, as shown in FIG. 4.

Figure 4:
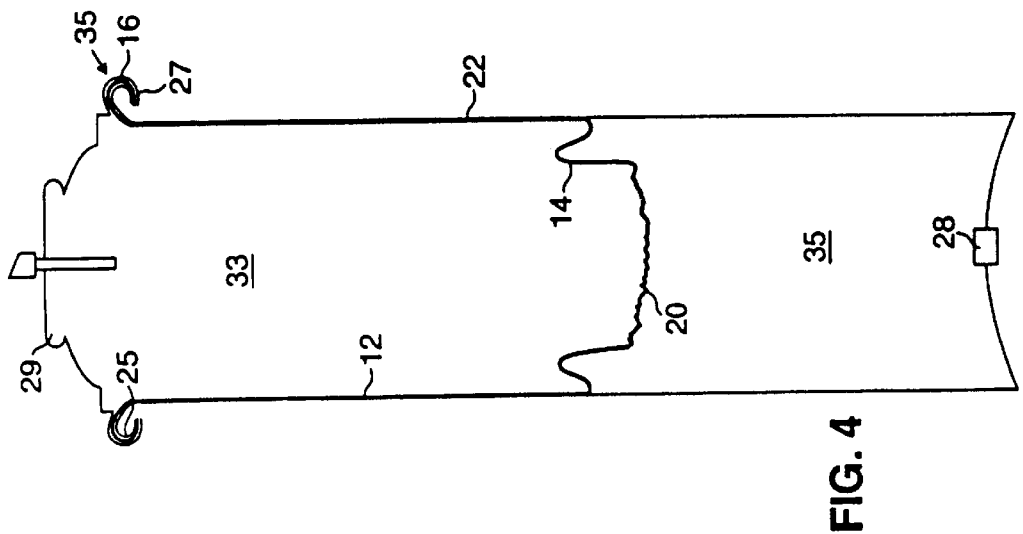
FIG. 4 is a schematic view of the barrier of this invention within an aerosol container after the product has been partially evacuated from the container.
Figure 5:
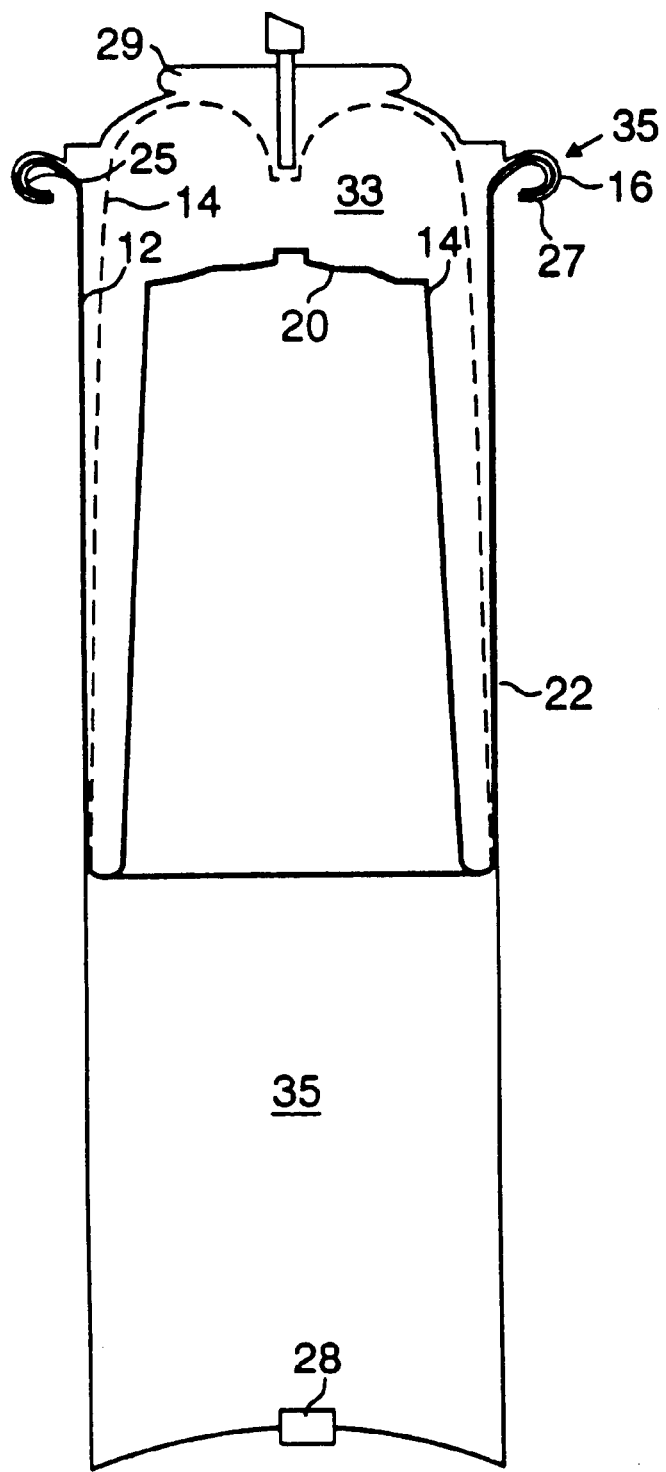
FIG. 5 is a schematic view of the barrier of this invention within an aerosol container after the product has been further evacuated and the barrier has inverted to the shape as initially present in the aerosol container, also showing in dotted-line a full evacuation of product.

If the outer wall segment 12 has a sufficient thickness throughout from the terminal flange 16 to the fold 15, then the outer wall segment will continue to substantially conform to the inner surface 23 of the container wall throughout the product evacuation shown schematically in FIGS. 4 and 5. The barrier then returns to approximately its initial shape as shown in FIG. 5, followed by radial and axial stretching of inner wall segment 14 and central piston region 20 to the dotted line configuration shown in FIG. 5 to obtain substantially complete product evacuation from the container. To obtain this action, the thickness of outer wall segment 12 likely will need to be substantially greater than the 0.007" thickness referenced above; without wishing to in any way be limited, the thickness may be of the order of 0.020" to 0.025" from flange 16 to fold 15, or sufficient to obtain the full inversion of the inner wall segment within the outer wall segment shown in FIG. 5. With this thicker outer wall segment more viscous products may be fully evacuated from the container without significant pocketing. The inner wall segment will still remain thin and flexible.

If the outer wall segment 12 has a thickness of the order of 0.007", the transition from FIG. 4 to nearly complete product evacuation will result in both inner and outer wall segments 12 and 14 crumpling inwardly and tightly together, and moving upwardly. In this instance, using water as a simulated product, substantially complete product evacuation was obtained from a test set-up without significant pocketing. Where more viscous products are used, however, it is expected that the thicker outer wall segment 12 will need to be utilized to obtain the full product evacuation without significant pocketing.

It has been observed that the frustoconical configuration of the inner wall segment 14 results in the inner wall segment 14 progressively inverting in an axial direction within the outer wall segment 12, where outer wall segment 12 is sufficiently thick, to cause the progressive advance of the product to the discharge valve and a minimization of the capture or entrapment of product in pockets.

The tapering of the outer wall segment facilitates the invagination of the barrier of the present invention into the pressurized container. The presence of the tapering of both the outer and inner wall segments, and at small angles, also allows maximum nesting of the barriers for convenience and cost savings in shipping the barriers from a manufacturing site to the site of the container manufacturing operation. At the container manufacturing site, the stacks of nested barriers facilitate fast and easy feeding of the barriers sequentially into the containers. Each nested barrier may be pulled from its stack into its intended container under the influence of an initial vacuum in the container shell, each barrier as it is inserted into its container shutting off the vacuum; alternatively each nested barrier may be blown by air from its stack into the intended container. The next container shell is fed under the stack of nested barriers, and the identical action continues for the next container and next barrier. Containers continue to be sequentially fed under the nested stacks of barriers, and the nesting provides for a high speed and very simple feeding operation.

Figure 6:
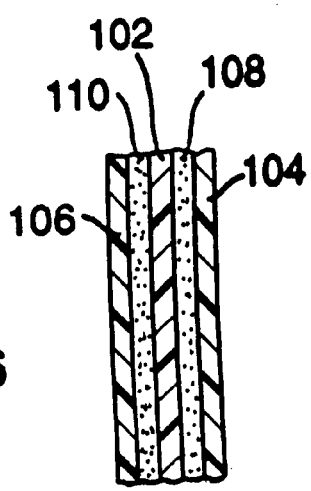
FIG. 6 is a partial cross-sectional view of a multilayered barrier of the present invention.
Figure 7:
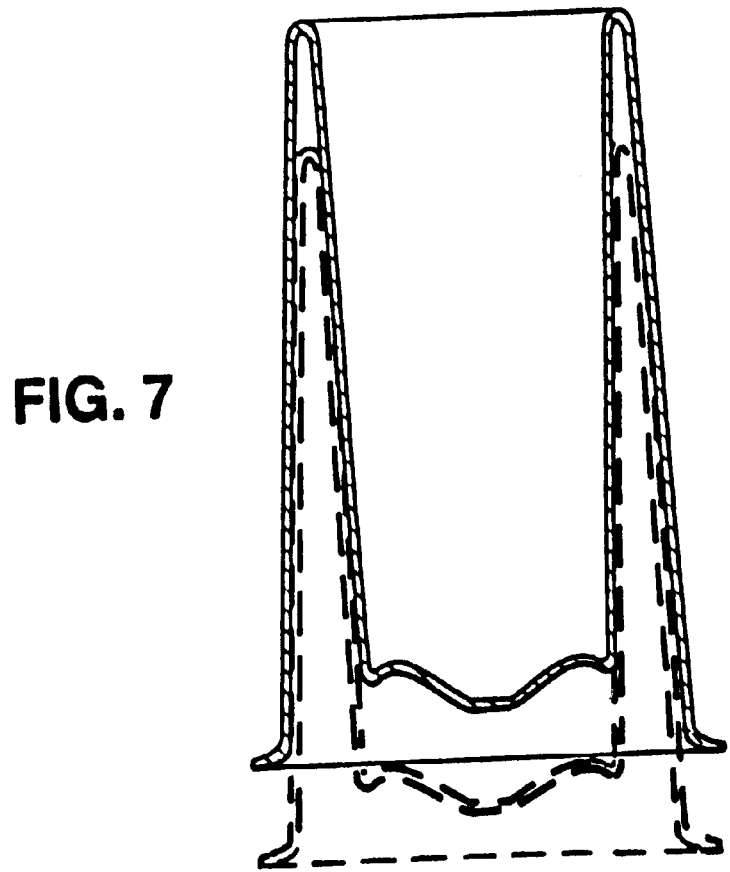
FIG. 7 shows barriers of this invention in a nesting relation.

In order to overcome the problem of permeation of propellant and/or product through the barrier found in prior art dispensers, the flexible barrier in accordance with the present invention is optionally made of a multilayered material. FIG. 6 shows a wall construction consisting of an inner layer 102 designed to prevent transport of propellant and product. Layer 102 is sandwiched between outer layers 104 and 106 that are inert to propellant or product in contact with the outer layers. Adhesive layers 108 and 110 are optionally provided, or alternatively the inner and outer layers 102, 104 and 106 may be fused together by heat or other means. In one embodiment, the inner layer 102 is a gas barrier layer and the outer layers 104 and 106 are aqueous or organic fluid barrier layers. The gas barrier layer may be made of PET, ethylene vinyl alcohol, polyvinylalcohol, polyvinylidene chloride, polyacrylonitrile, cellophane or other similarly suitable materials. The outer layers may be made of PET, polyethylene, (especially high density polyethylene) polypropylene, polytetrafluoroethylene, polybutane, surlyn ionomer, butyl rubber, polyvinylidene chloride, polychlorotrifluoroethylene, Penton, polyvinylfluoride or other similarly suitable materials. Ethylene vinyl alcohol and polyvinyl alcohol are preferred gas barrier materials and high density polyethylene is a preferred aqueous or organic fluid barrier material.

Any propellants known in the art may be used with the dispenser and flexible barrier of the present invention. The barrier of the present invention requires smaller amounts of liquified propellants than required in non-barrier pack aerosol systems and in certain barrier pack systems using compressed gases, thus allowing the economic use of more expensive propellants. The present system lends itself to a maximization of the amount of product to be dispensed from a given container.

Figure 8:
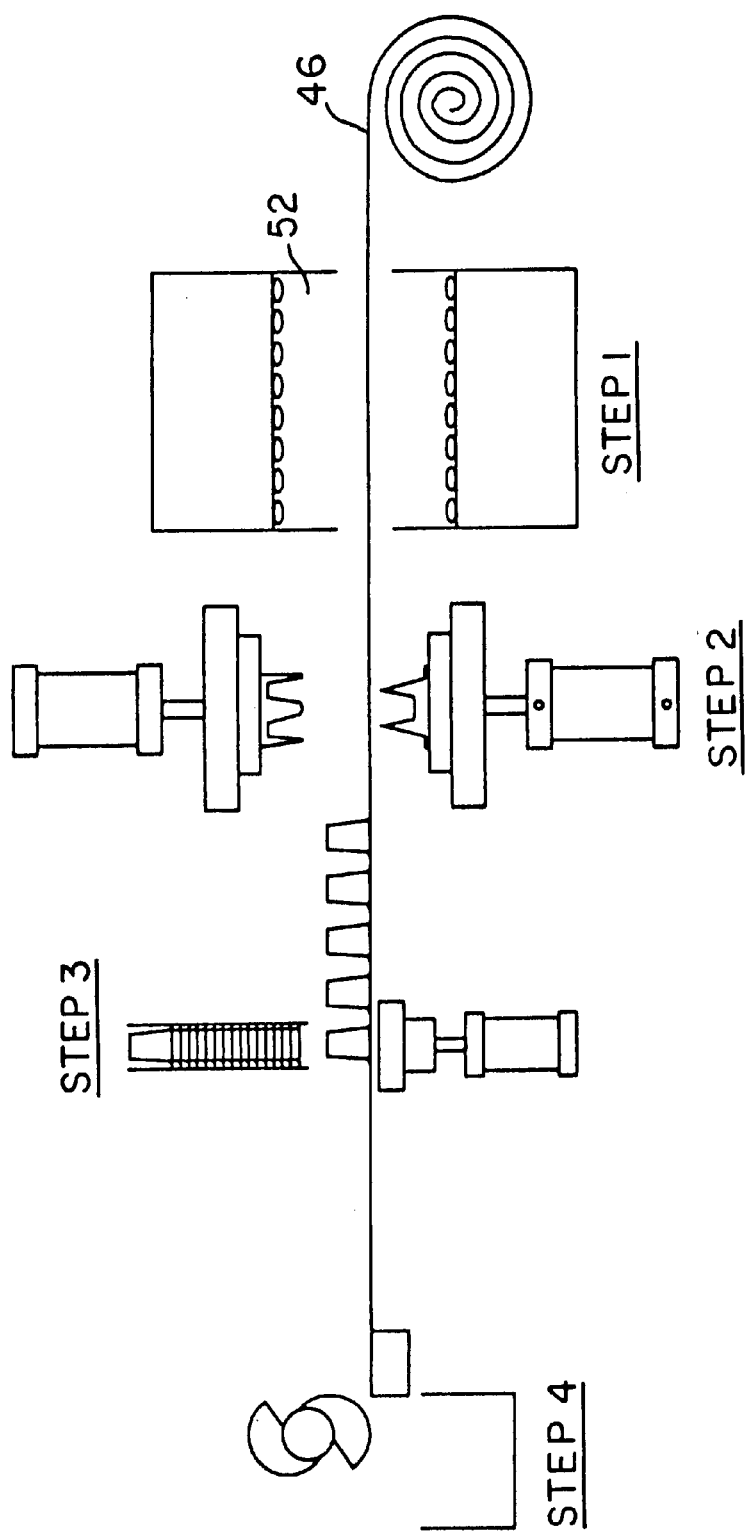
FIG. 8 is a schematic diagram of the several steps used in fabricating the barrier pack of this invention from a plastic sheet.

The barrier pack of this invention as described at pages 9 and 10 hereof is presently manufactured utilizing a forming process generally referred to as thermoforming. The thermoforming technique for manufacturing plastic shapes from a sheet of the plastic material is well-known in a general sense. Specific modifications of the general techniques are used to tailor the thermoforming process to the forming of a particular shape. The schematic diagram of FIG. 8 shows the several steps involved in the forming of the barrier packs of this invention. In step 1, the plastic sheet material, PET, for example, having a thickness of 0.025", is passed through a dry heat zone (oven) to bring the PET to a forming temperature of 250°–330° F. It is desirable to have the PET at 285°–300° F., that is, to avoid the extremes of the 250°–330° F. range. The PET material found suitable for forming the barrier packs is biaxially oriented and suitable for deep draw thermoforming.

The barrier pack of this invention is a deep drawn part and thus is susceptible to "webbing", i.e. the formation of a fold of excess material at the mold base and the barrier side wall. Where "webbing" is a concern, careful control of the temperature of the plastic sheet material is critical. Moreover, with temperature control and avoidance of a temperature above the distortion temperature of the plastic sheet material, a degree of plastic memory is retained by the plastic material, this memory aiding in the preclusion or removal of the "webbing" problem.

Figure 9:
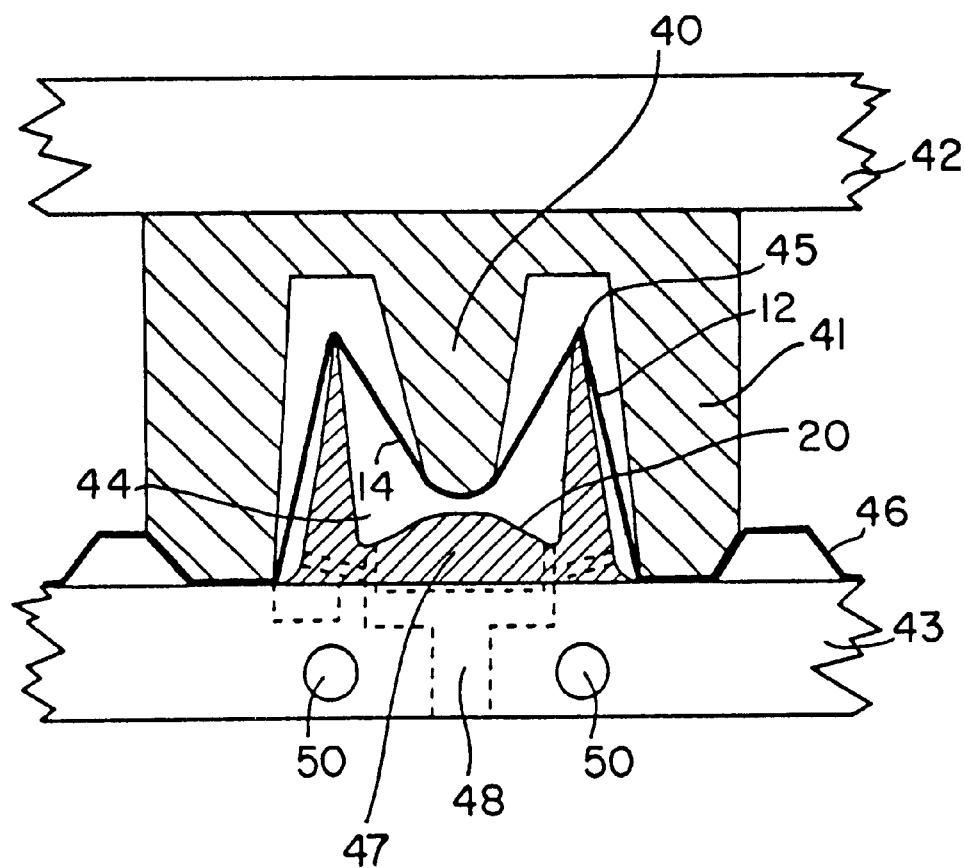
FIG. 9 is a schematic of the thermoforming equipment used in forming the barrier pack of this invention.

In step 2, the pre-heated PET sheet is moved to the forming station (thermoformer), whereat the PET sheet is prestretched using a "plug assist" for the initial forming of the inner wall segment and the piston region of the barrier pack and using a "ring" to partially form the outer wall segment. Also see FIG. 9. The "ring" assists in the avoidance of "webbing". The "plug assist" and "ring" are mounted on the upper movable platen (top base plate) of the thermoformer equipment, directly across from the lower movable platen (base plate) on which the mold is mounted. After disposing the heated plastic sheet between the upper and lower platens, the forming operation is commenced by moving the platens toward each other to sandwich the heated sheet. During the course of moving the platens until their ultimate contacting against each other, the "plug assist" and "ring" draw the sheet into and around the interior cavity surface of the mold to force the heated PET sheet to conform and contact the mold at the fold joining the outer wall segment and the inner wall segment and at the base of the "ring". The "ring" in forcing the PET plastic sheet against the base plate of the thermoforming equipment effects an annular seal around the mold. After effecting the seal, vacuum is applied to the mold to cause the PET plastic sheet to be drawn against the mold surface and thereby complete the final shaping of the PET plastic sheet.

The mold is water cooled, teflon coated aluminum, heat conductive, and the "plug assist" and "ring" are fine-grained wood covered with felt to avoid scuffing and sticking of the formed part.

After adequate cooling, the upper and lower platens are separated and the formed sheet transported to the trimming station (step 3) whereat cutting dies trim the formed parts. The formed parts are ejected to a stacker and the trimmed residue at the sealing flange is ground for recycling and reclaiming in the plastic sheet extrusion process.

It is believed that biaxial orientation of the plastic during the extrusion of the plastic sheet to be thermoformed decrease the permeation of the barrier material.

To manufacture a barrier with a thick outer wall segment 12 from the terminal flange 16 to the fold 15 as described at page 12, line 13 through page 13, line 4, it may be necessary to resort to "blow molding" processes utilizing controlled parisons of the appropriate configuration. Such manufacturing techniques are well within the skill of the art.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

I claim:

1. A dispenser for the pressurized dispensing of product, comprising:

a container having a bottom, a side wall, a top, an opening in said top for mounting an externally actuable valve means, and a closable opening in said bottom for introducing propellant into said container;

an externally actuable valve means extending through said top opening for dispensing product from within said container;

a unitary flexible barrier sealed between the sidewall and top of said container for defining a first zone above said barrier for holding the product in fluid communication with said valve means and a second zone below said barrier for holding a propellant out of fluid communication with said first zone;

said barrier being a shaped spatial form having a terminal sealing means, a flexible wall portion, and a central piston region, said sealing means, wall portion and piston region being formed as a unitary spatial form with sufficient rigidity to maintain its shape prior to and during insertion into said container;

said flexible wall portion having an inner wall segment and an outer wall segment connected by a fold;

said outer wall segment being a steeply frustoconical shape and extending from the terminal sealing means to the fold, said outer wall segment and fold being dimensioned upon insertion into a container to form an initial spaced relationship with the inner side container surface;

said inner wall segment being an oppositely-directed, steeply frustoconical, shape contained within the outer wall segment and extending upwardly from the fold;

said central piston region being connected to and extending across the area defined by the circumference of the inner wall segment to close and complete the unitary barrier member;

said inner wall segment having sufficient flexibility to permit said inner wall segment and said central piston region to move in an axial direction within the container.

2. The invention of claim 1 wherein the outer wall segment and the inner wall segment form an acute angle ending at the fold.

3. The invention of claim 1 wherein said unitary barrier is comprised of PET.

4. The invention of claim 1 wherein said inner wall segment is slightly shorter in top to bottom dimension than said outer wall segment.

5. The invention of claim 1 wherein at least a portion of said central piston region is thicker and more rigid than said inner wall segment.

6. The invention of claim 1 wherein said terminal sealing means is a flange extending outwardly from the outer wall segment.

7. The invention of claim 1 wherein said central piston region has an outer periphery that emerges from the inner wall segment at an angle to said inner wall segment.

8. The invention of claim 1, wherein the barrier is multi-layered, the inner layer being impervious to the transport of product and propellant and the outer layers being inert to the product or propellant contiguous thereto.

9. The invention of claim 1 wherein said unitary barrier is substantially fully nestable with further identical barrier members, the frustoconical outer and inner wall segments and intervening fold of each barrier nesting with the corresponding parts of further identical barrier members.

10. The invention of claim 1 wherein said central piston region is flexible and expandable.

11. The invention of claim 1 wherein said outer wall segment is thicker and more rigid than said inner wall segment.

12. The invention of claim 1 wherein said central piston region has an outer periphary which is connected at an angle to said inner wall segment.

* * * * *